United States Patent [19]
Yannuzzi, Jr.

[11] Patent Number: 5,814,382
[45] Date of Patent: Sep. 29, 1998

[54] BAG AND METHOD OF MAKING THE SAME

[75] Inventor: Gilbert N. Yannuzzi, Jr., Ames, Iowa

[73] Assignee: American Packaging Corporation, Philadelphia, Pa.

[21] Appl. No.: 301,853

[22] Filed: Sep. 7, 1994

Related U.S. Application Data

[63] Continuation-in-part of Ser. No. 278,919, Jul. 22, 1994.

[51] Int. Cl.[6] .............................. B65D 33/00; B65B 9/00; B32B 7/12
[52] U.S. Cl. ...................... 428/34.3; 428/35.2; 428/35.3; 428/35.5; 428/194; 428/201; 428/343; 428/349; 428/906; 383/35; 383/37; 426/107; 426/113; 53/459; 493/210; 493/220; 493/276; 493/292; 493/297; 493/308
[58] Field of Search .................................. 428/35.2, 35.3, 428/35.5, 906, 349, 347, 343, 194, 201, 34.3; 206/390; 383/37, 35, 100; 426/107, 113; 53/459; 493/210, 220, 276, 292, 297, 302, 308

[56] References Cited

U.S. PATENT DOCUMENTS

| | | | |
|---|---|---|---|
| 3,051,103 | 8/1962 | Williams | 493/220 |
| 3,672,328 | 6/1972 | Kardon | 118/221 |
| 3,851,574 | 12/1974 | Katz et al. | 426/107 |
| 3,973,045 | 8/1976 | Brandberg | 426/110 |
| 4,076,121 | 2/1978 | Clayton et al. | 428/906 |
| 4,461,031 | 7/1984 | Blamer | 383/123 |
| 4,571,337 | 2/1986 | Cage et al. | 426/107 |
| 4,691,374 | 9/1987 | Watkins | 383/104 |
| 4,804,573 | 2/1989 | McCarthy et al. | 428/201 |
| 4,844,956 | 7/1989 | Galimberti | 428/906 |
| 4,892,744 | 1/1990 | Ylvisaker | 426/111 |
| 5,044,777 | 9/1991 | Watkins | 383/100 |
| 5,061,500 | 10/1991 | Mendenhall | 426/107 |
| 5,155,979 | 10/1992 | McDonald | 53/450 |
| 5,302,790 | 4/1994 | Turpin | 383/100 |
| 5,387,449 | 2/1995 | Kunz et al. | 428/35.2 |

*Primary Examiner*—Rena L. Dye
*Attorney, Agent, or Firm*—John F. A. Earley; John F. A. Earley, III; Harding, Earley, Follmer & Frailey

[57] ABSTRACT

A bag suitable for use in microwave cooking is constructed of an elongated tube of flexible material closed at one end by means of a cold seal closure and having a heat seal adhesive deposit applied to the other end thereof for use in closing the bag after filling thereof; and methods of making the same are described, including the making of a roll from which said bags can be made.

10 Claims, 11 Drawing Sheets

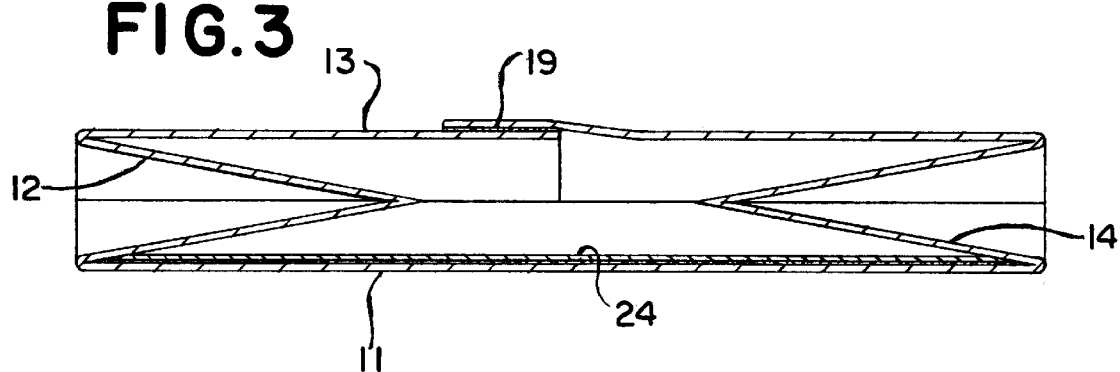
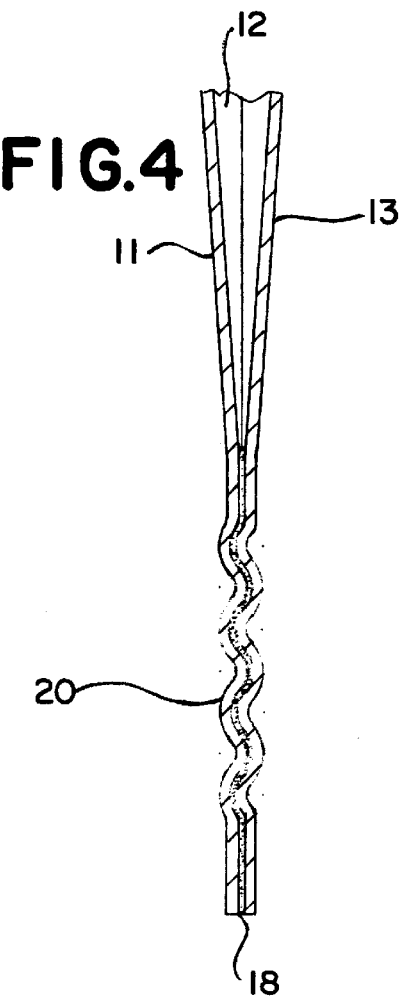

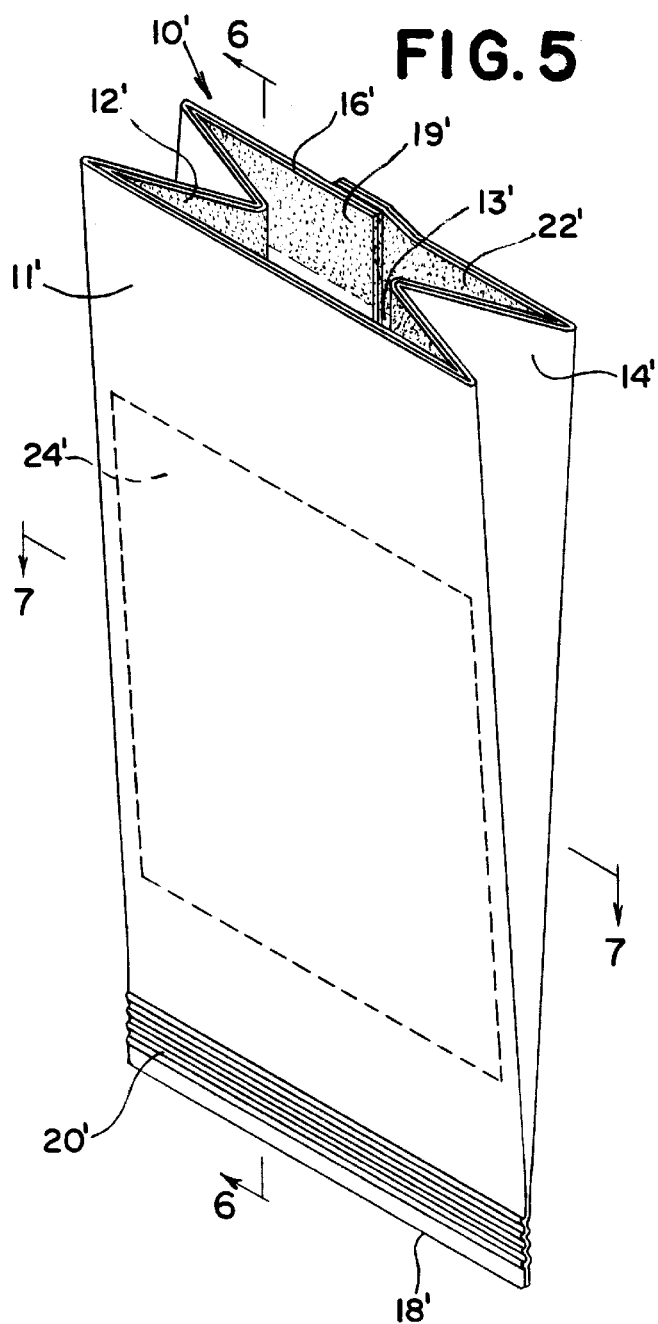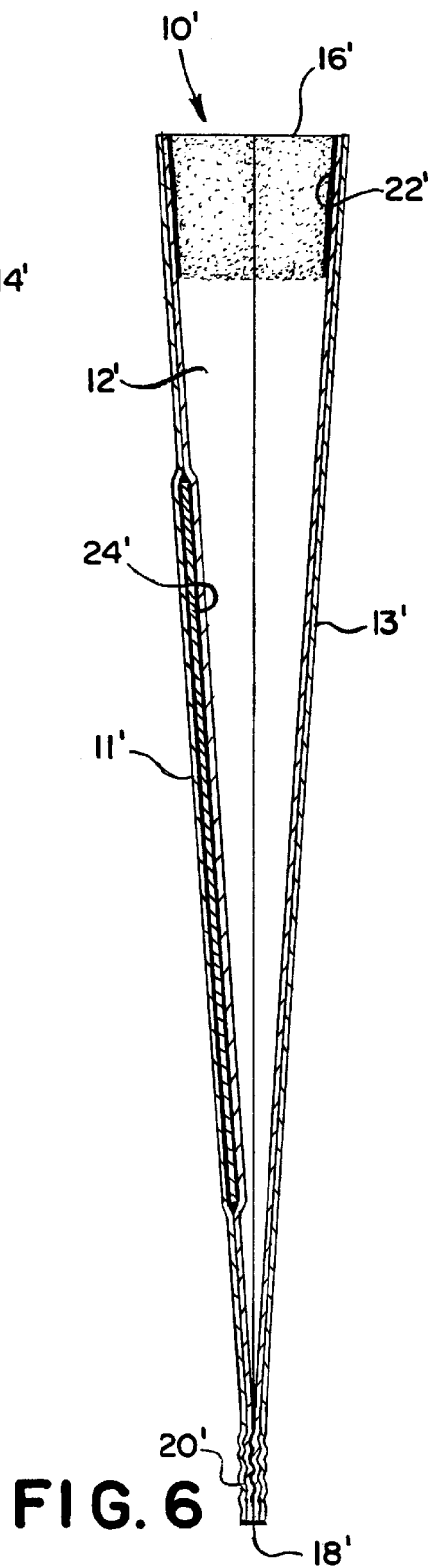

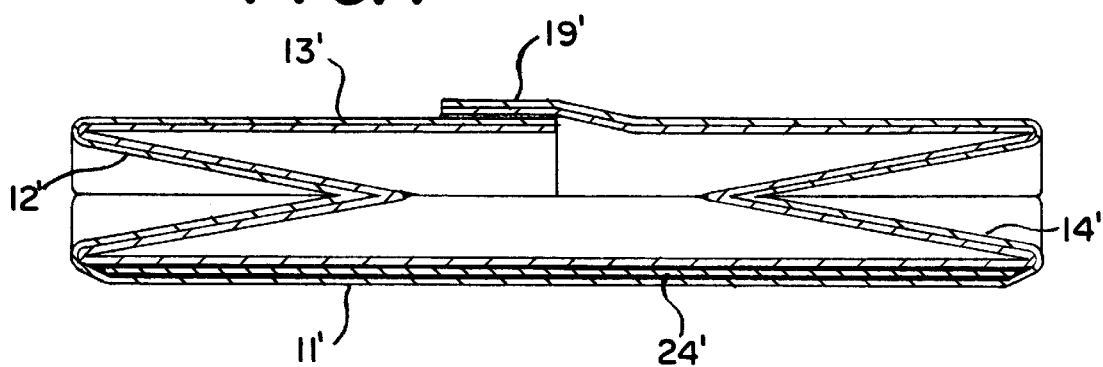
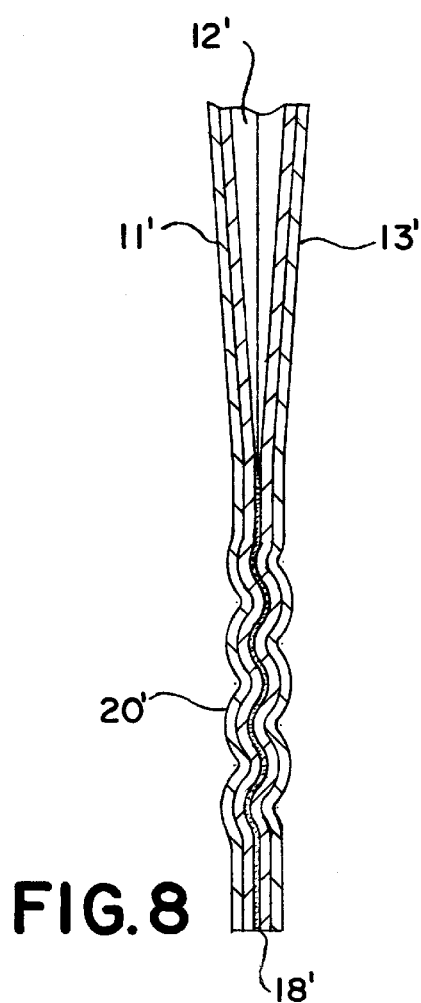

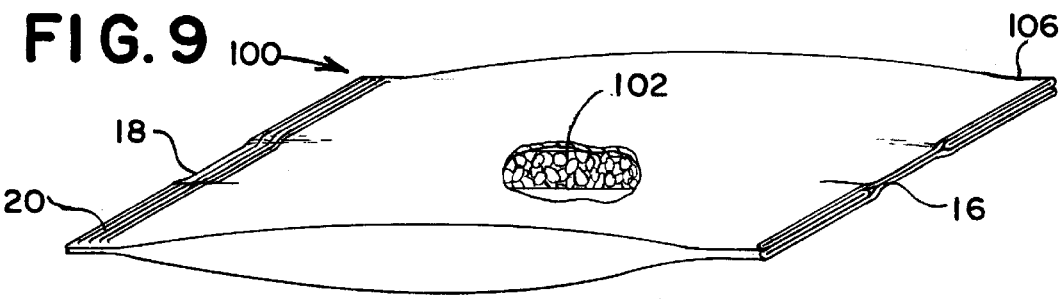
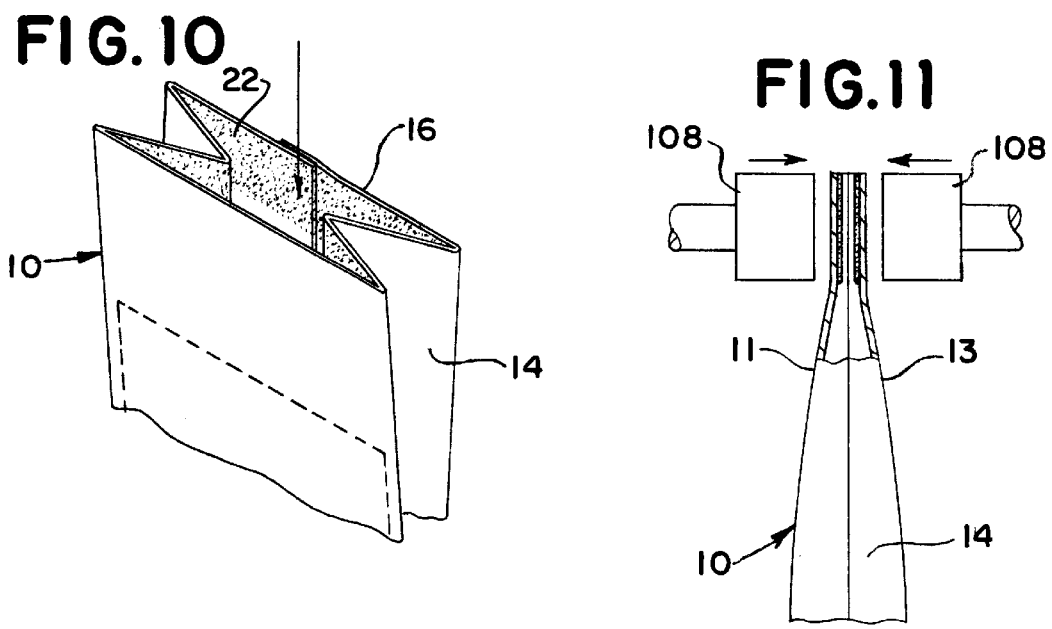
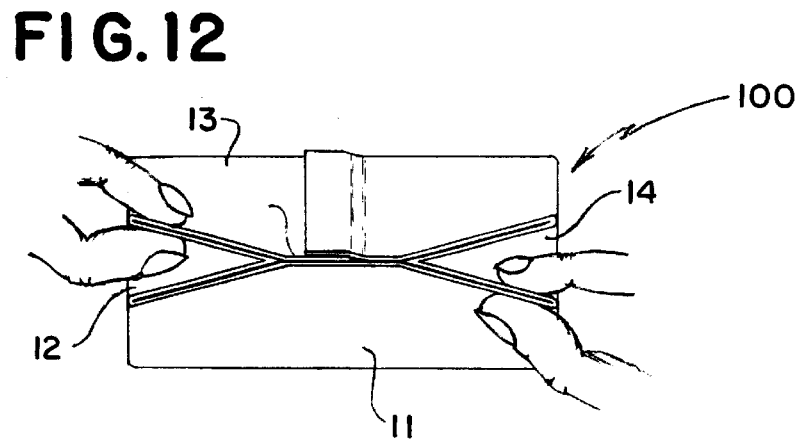

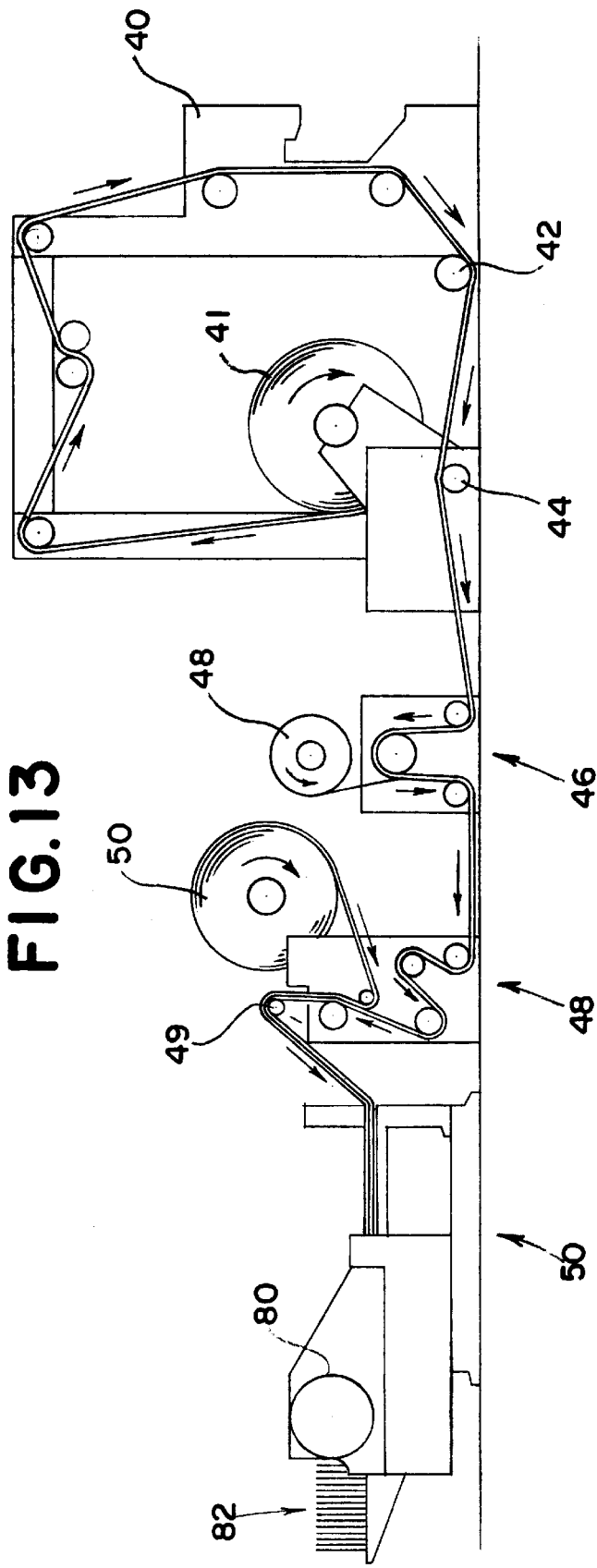

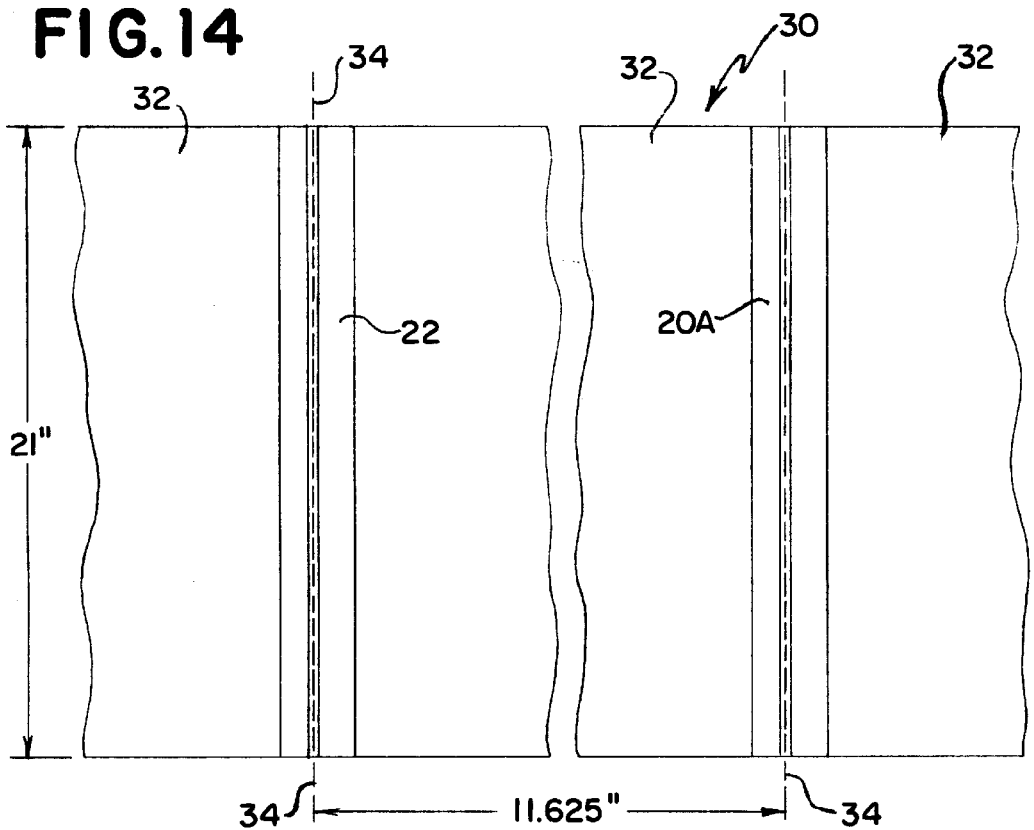
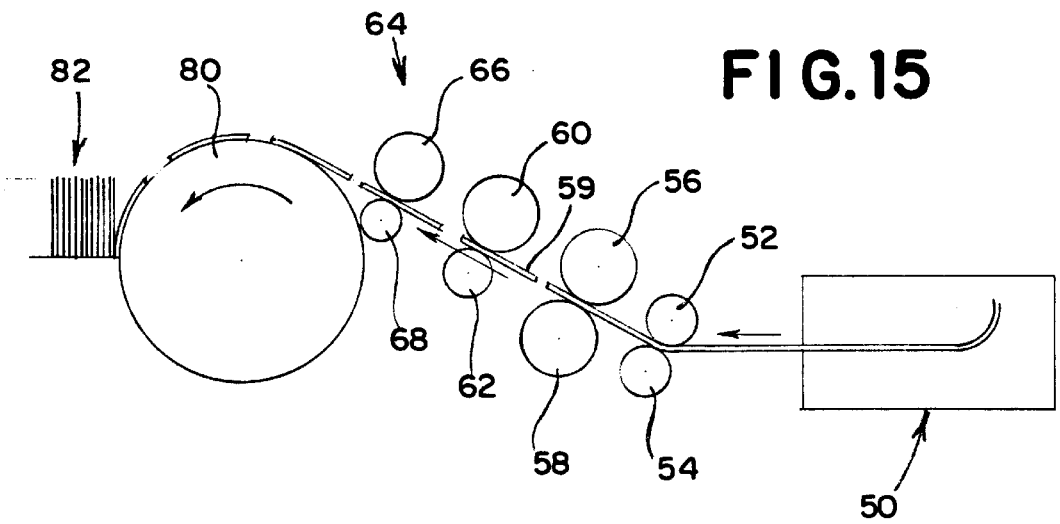

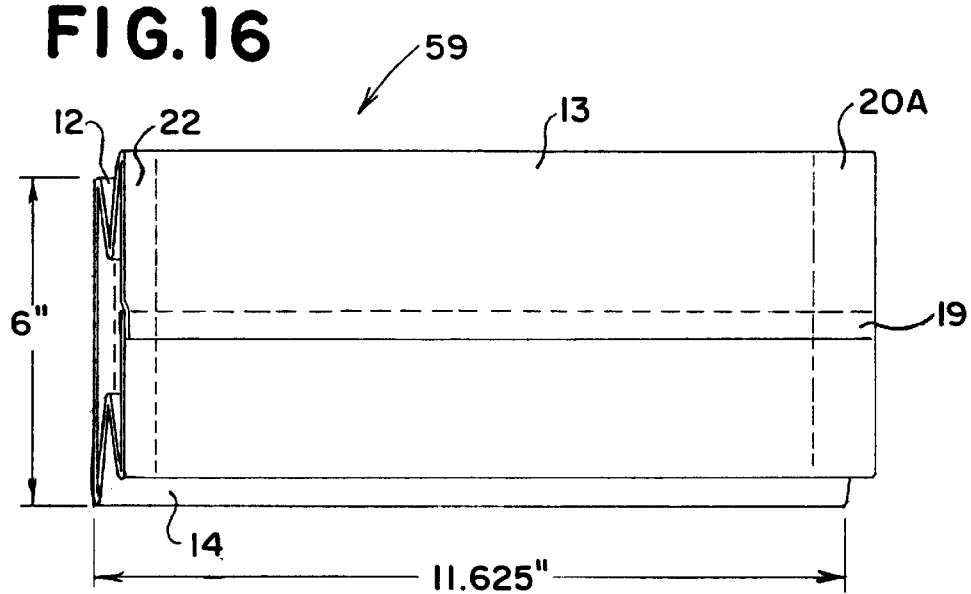
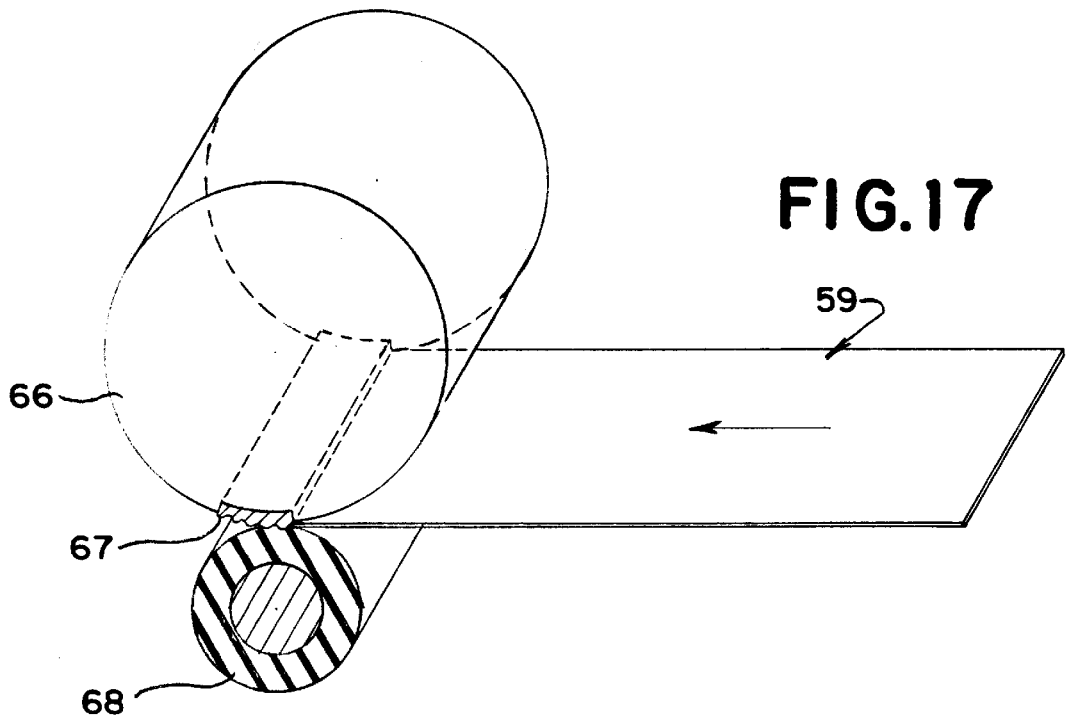

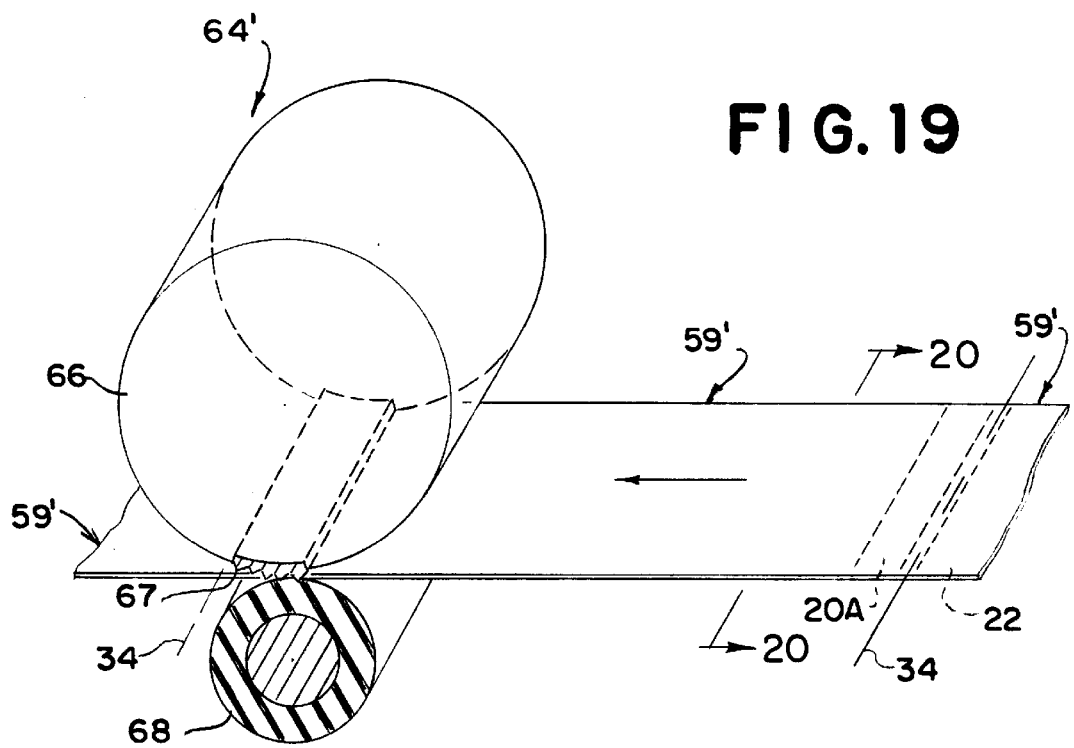

BAG AND METHOD OF MAKING THE SAME

This application is a continuation-in-part of application Ser. No. 08/278,919 filed Jul. 22, 1994, which has been allowed.

BACKGROUND OF THE INVENTION

1. Field of the Invention

This invention relates to a bag of the type usable in microwave cooking of food products, such as popcorn. The invention also relates to a method of making a bag of the indicated type.

2. Description of the Prior Art

Microwave popcorn bags are well known. Illustrative of bags of this type are those disclosed in U.S. Pat. Nos. 3,691,374; 3,851,574; 3,973,045; 4,461,031; 4,571,337; 4,691,374; 4,892,744; and 5,044,777.

Although bags of the above-indicated type are generally satisfactory, there is need for improvement thereof in two areas, namely, in the cost of manufacture, and in the use of microwave packages made therefrom. Present day bags of the indicated type are formed into packages containing popcorn kernels, the packages being closed at upper and lower ends thereof by means of heat seals formed by the application of heat and pressure. The use of heat seals to close both ends of the bag is the source of two problems. The first problem is that it is difficult to provide a bag making process which can operate at a high speed because the formation of a heat seal closure requires a considerable dwell time, which extends the length of the production line. Another problem is that heat seal closures are difficult to open after the microwave cooking operation in order to gain access to the cooked product.

Attempts to provide an easily openable popcorn package are disclosed in U.S. Pat. No. 4,571,337, which illustrates in FIGS. 7 and 8 the manner in which the bag is opened by pulling on diagonally opposite corners at the upper end of a package after the microwave cooking operation is completed. The use of a heat seal closure as disclosed in U.S. Pat. No. 4,571,337, which is illustrative of the prior art, has proved to present problems in the easy opening of the bag. In many applications with the heat sealed closures of the prior art, the closure strength provided by the heat seal is greater than the tear strength of the paper forming the side panels of the bag thereby resulting in torn bags, spilled popcorn, and possible steam exposure to the consumer during the opening of the bag.

SUMMARY OF THE INVENTION

It is the general object of the present invention to provide a bag suitable for use in microwave cooking which comprises an elongated tube of flexible material sealed at one end by a cold seal closure and adapted to be sealed at its other end by a heat seal closure.

By reason of the construction in accordance with the invention wherein the bag is made with a cold seal at one end, it is possible to provide a high speed, compact bag making process which does not require the formation of a heat seal during the making of the bag.

In accordance with another feature of the invention, the cold seal closure can be designed to respond to the microwave cooking operation so as to provide a peelable closure which can be opened without tearing the side panels of the bag structure. Moreover, the openability of the cold seal closure is maintained for a longer time period after a cooking operation since it functions at lower temperatures than a comparable heat seal closure.

Another object of the invention is to provide methods of making a bag of the indicated type including the making of a roll comprising a tubular web from which a plurality of said bags can be made.

BRIEF DESCRIPTION OF THE DRAWINGS

FIG. 3 is a sectional view taken on line 3—3 of FIG. 1.

FIG. 4 is a detail view showing the cold seal of the bag shown in FIG. 1.

FIG. 5 is a perspective view of a microwave popcorn bag pursuant to a second embodiment of the invention.

FIG. 6 is a sectional view taken on line 6—6 of FIG. 5.

FIG. 7 is a sectional view taken on line 7—7 of FIG. 5.

FIG. 8 is a detail view showing the cold seal of the bag shown in FIG. 5.

FIG. 9 is a perspective view showing a package in accordance with the invention.

FIG. 10 is a view showing a first step in the procedure for providing a package made of the bag in accordance with the invention.

FIG. 11 is a view showing a second step in the method of making the package in accordance with the invention illustrating the step of heat sealing the top of the bag to close the same.

FIG. 12 is a view illustrating the procedure used to manually open the heat sealed end of the package after a microwave cooking operation in order to gain access to the contents of the package.

FIG. 13 is a side elevation, partly in diagrammatic form, showing a manufacturing process line for making a bag in accordance with the invention.

FIG. 14 is a plan view of a part of a web for use in forming the bag in accordance with the invention.

FIG. 15 is a detail view showing part of one work station of the process line shown in FIG. 13.

FIG. 16 is a view showing a tube formed during the process of making a bag in accordance with the invention.

FIG. 17 is a detail view of the mechanism for forming the cold seal at one end of the bag in accordance with the invention.

FIG. 19 is a detail view of the mechanism employed in the process line shown in FIG. 18 for forming the cold seal at one end of the bag in accordance with the invention.

FIG. 20 is a sectional view taken on line 20—20 of FIG. 19.

DETAILED DESCRIPTION OF THE PREFERRED EMBODIMENTS

Figures 1, 2:
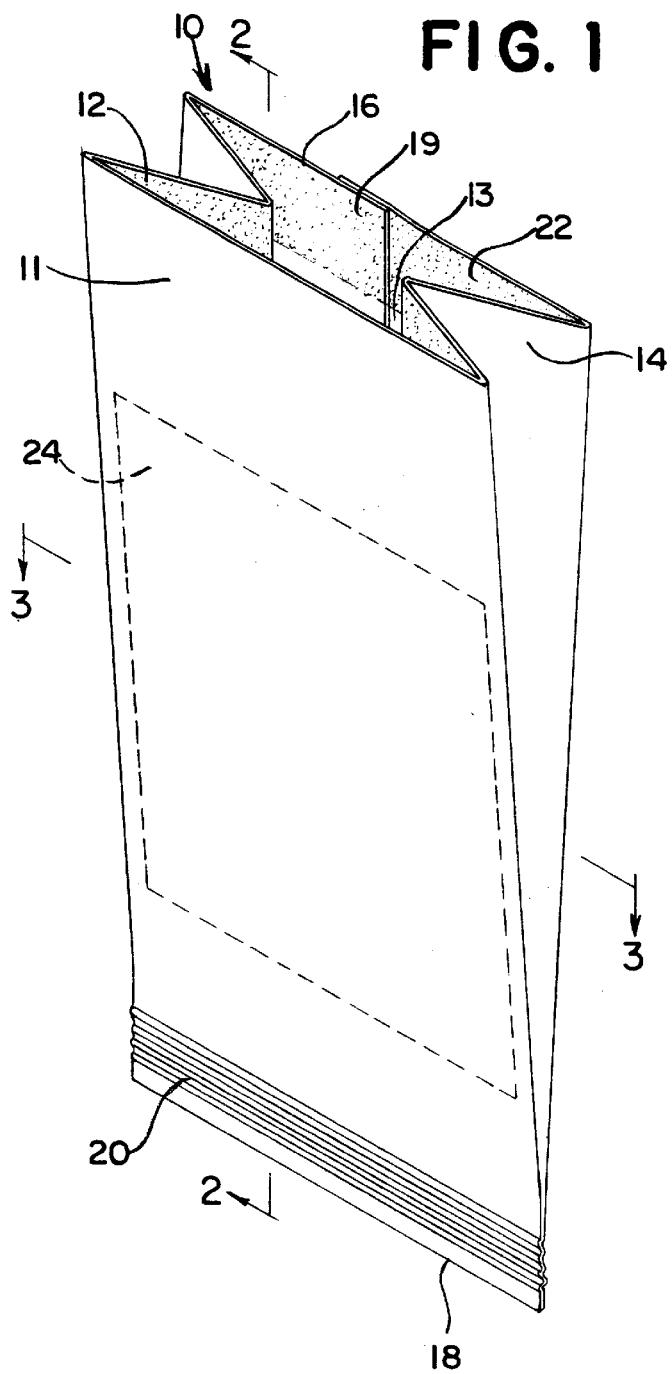
FIG. 1 is a perspective view of a microwave popcorn bag pursuant to a first embodiment of the invention.
FIG. 2 is a sectional view taken on line 2—2 of FIG. 1.

In FIGS. 1 to 4, there is shown a bag 10 in accordance with the invention suitable for use as a microwave popcorn bag. Bag 10 has a conventional pinch bottom bag construction comprising a tubular construction including a pair of opposed rectangular side panels 11 and 13 joined by a pair of opposed inwardly-folded gusseted side panels 12 and 14, all of which extend between and define an open end 16 and a sealed closed end 18 of the tubular construction shown. Bag 10 is made of a single-ply of flexible material, such as, for example, a grease-resistant paper of approximately 25–35 pounds per ream of a type well known in the art.

The tube forming the bag 10 is sealed along a longitudinal seam 19 by means of an aqueous adhesive as is conventional in the art.

The closed end 18 is sealed by a cold seal closure 20 in accordance with the invention. The term "cold seal" (also referred to in the art as a "cohesive seal") is used in the art, and hereinafter, to define a seal or bond formed by an adhesive which exhibits an affinity for itself, whereby when two separate surfaces having said adhesive thereon are brought together under pressure, they exhibit a strong tendency to stick to each other. The "cold seal" or "cohesive seal" in accordance with the invention is formed by an adhesive which provides a "fiber tearing" or "destruct" bond on the paper material, without the aid of heat or dwell time (as is required in a typical heat seal), when brought together under pressure only. The adhesive deposited to produce the cold seal closure 20 is a cohesive with good adhesion to paper substrates and having heat resistance in a microwave application, an example of which is a cold seal cohesive available from VALLEY ADHESIVES and COATING CORPORATION of Appleton, Wis. and sold under the tradename "Instabond" and designated as product C-2179-A. More specifically, this cohesive is a natural latex cohesive having a density of approximately 8.3 lbs/gal.

By way of example, the cold seal adhesive is applied in a pattern comprising a three-quarter inch wide band extending around the inner surface of panels 11–14 at the end 18 of the bag 10 shown in FIG. 1 at a dry coating weight of two to four pounds per ream, with bag 10 being 6.0 inches wide and 11.625 inches long.

The cold seal closure 20 is constructed and arranged to provide a bond which at ambient temperature cannot be opened without tearing the paper material, but which at an elevated temperature, such as that produced on the closure 20 by a microwave cooking operation, will be softened to form a "peelable" closure that can be opened easily without tearing the paper material by the manual application of a separating force which pulls side panels 11–14 apart. The term "peelable" as used in the art, and herein, is defined as the property whereby two plies of adhered material can be separated with failure occurring in the adhesive and not in the surface of the plies. Thus, cold seal closure 20 is made to withstand the rigors of microwave cooking and provide the "easy open" operation described above.

At the open end 16 of bag 10, there is provided a deposit of a heat seal adhesive 22 for use in closing this end of the bag 10 after the bag 10 is filled with popcorn kernels, and oil usually, by the packager. The heat seal adhesive 22 is applied in a pattern comprising a band extending around the inner surface of the panels 11 to 14. In the example of a 6×11.625 inch bag described above, the band of heat seal adhesive 22 has a width of approximately 1.375 inches. The application and arrangement of heat seal adhesive 22 is pursuant to present day practice. In accordance with the invention, the deposit of heat seal adhesive 22 is adapted to form a heat seal closure that forms a bond that is stronger (i.e., can better withstand the force therein caused by expanded gases produced within the bag 20 during cooking) than the bond formed by cold seal closure 20 at the elevated temperatures produced by a microwave cooking operation for which bag 10 is made. Moreover, the cold seal closure in accordance with the invention is particularly suited to being constructed and arranged to provide controlled venting whereby the package is vented at the end having the cold seal closure at a desired stage of the microwave cooking. This obviates a problem with the prior art packages having heat seal closures at both ends wherein the desired venting fails to occur thereby resulting in a poorly cooked product.

Side panel 11 is provided with a susceptor 24 formed of a paper/metalized polyester film laminate. It will be apparent that a wide variety of metals and polyester films can be used to produce susceptor 24. Susceptors are well known in the art and, generally, the preferred polyester film is PET (polyethylene terephthalate) and the metal is preferably aluminum. Susceptor 24 is a rectangular patch attached to the material forming bag 10 during the bag making process. Instead of providing a patch, it is also known in the art to print a susceptor material on the paper layer or on another laminating material.

The microwave popcorn bag 10 shown in FIGS. 1 and 2 is very economical to manufacture and can be formed into a popcorn package which is very easy and effective to use. Thus, bag 10 is closed at its one end 18 by the cold seal closure 20 described above and is open at its other end 16 which is used for filling the enclosed space within bag 10 located between the side panels 11–14. After filling the bag 10 with the desired amount of popcorn kernels, the end 16 is sealed in a conventional heat sealing procedure by applying heat and pressure to this end of the bag 10 to provide a heat sealed closure along the band of adhesive 22 as is conventional in the art. It is also common practice to tack the gusseted panels 12 and 14 together at end 16 by the use of heat seal adhesive applied to the opposing exterior surfaces thereof as is conventional in the art.

The bag 10 is also easy to use because the cold seal closure 20 is designed to form a peelable closure that, upon the application thereto of heat from a microwave cooking operation, can be opened easily without tearing by the manual application of a separating force which pulls the side panels 11–14 apart. This opening procedure is conventional in the art and is disclosed in the above-discussed patents. However, the novel cold seal closure 20 in accordance with the invention provides better results and permits the use of lighter weight microwavable bag structures, such as the single ply material for bag 10.

In FIGS. 5 to 8, there is shown a microwave popcorn bag 10' which is essentially the same as the bag 10 shown in FIGS. 1 to 4, wherefore, corresponding parts are given the same reference numerals with primes added.

Bag 10' is the same size as bag 10 and also suitable for use as a microwave popcorn bag. Bag 10' has a conventional pinch bottom bag construction comprising a tubular construction including a pair of opposed rectangular side panels 11' and 13' joined by a pair of opposed inwardly-folded gusseted side panels 12' and 14', all of which extend between and define an open end 16' and a sealed closed end 18' of the tubular construction shown. Bag 10' is made of a two-ply flexible material, such as, for example, an inner ply of grease-proof paper of approximately 20–25 pounds per ream and outer ply of bleached or natural kraft paper of approximately 20–25 pounds per ream, said two-ply material being well known in the art.

The tube forming the bag 10' is sealed along a longitudinal seam 19' by means of an aqueous adhesive seal as is conventional in the art. The closed end 18' is sealed by a cold seal closure 20' such as cold seal 20 described above except that cold seal 20' is applied to the inner surface of the inner ply of the two-ply material used to make bag 10'.

At the open end 16' of bag 10', there is provided a deposit of a heat seal adhesive 22' for use in closing this end of the bag after the bag 10' is filled with popcorn kernels. The heat seal adhesive 22' is located at a band extending around the inner surface of the inner ply of the panels 11' to 14' and is the same as heat seal adhesive 22 described above.

Side panel 11' is provided with a susceptor 24' formed of a metalized polyester film as is conventional in the art. It will be apparent that a wide variety of metals and polyester films can be used to produce susceptor 24'. Susceptors are well known in the art and generally the preferred polyester film in PET (polyethylene terephthalate) and the metal is preferably aluminum. Susceptor 24' is a rectangular patch located on side panel 11' between the plies of the material forming bag 10' and is inserted in position during the bag making process as is conventional in the art.

The microwave popcorn bag 10' shown in FIGS. 5 to 8 is very economical to manufacture and can be formed into a popcorn package which is very easy and effective to use. Thus, bag 10' is closed at its one end 18' by the cold seal closure 20' described above and is open at its other end 16' for use in filling the enclosed space within bag 10' located between the side panels 11'–14'. After filling the bag 10' with popcorn kernels and oil, the end 16' is sealed in a conventional heat sealing procedure by applying heat and pressure to this end of the bag 10' to provide a heat sealed closure as is conventional in the art.

The bag 10' is also easy to use because the cold seal closure 20' is designed to form a peelable closure that, upon the application thereto of heat from a microwave cooking operation, can be opened easily without tearing by the manual application of a separating force which pulls the side panels 11'–14' apart as is conventional in the art and as is disclosed in the above-discussed patents.

FIG. 9 shows a microwave popcorn package 100 manufactured from a bag 10 in accordance with the invention. The bags 10 are shipped to a packager who completes the making of the package. Package 100 contains a quantity of unpopped kernels of corn 102 and has the end 16 of bag 10 sealed by a conventional heat seal closure 106. The filling of the bag 10 with a quantity of corn kernels is done through the open end 16 as shown in FIG. 10 after which this end 16 is closed by conventional heat sealing procedure illustrated in FIG. 11. As shown in FIG. 11, a pair of sealing jaws 108, at least one of which is heated, are pressed together across the upper ends of side panels 11 and 13 in the area of the heat seal adhesive deposit 22. As the jaws 108 are pressed together for a set dwell time under conditions of heat and pressure, a desired heat seal closure 106 is formed at the end 16 of bag 10.

FIG. 12 illustrates the procedure for opening a package 100 after the completion of a microwave cooking operation. It will be apparent that during the microwave cooking operation, the contents of the package 100, as well as the sealed closures 20 and 106, are heated, and the increased pressure of the gases within the package 100 cause it to expand a certain amount due to the generation of water vapor from the popping corn kernels. This applies pressure to the sealed closures 20 and 106, which, if desired can be designed to provide for venting as is well known in the art. The cold seal closure 20 is particularly suitable for the design of controlled venting as desired.

After the microwave cooking operation is completed, the popped corn is removed from the package 100 by manually opening the end 18 of the bag as illustrated in FIG. 12. The consumer is instructed on the package 100 to open the bag 10 carefully by pulling on top diagonal corners while avoiding contact with escaping steam. As discussed above, the novel cold seal closure 20 in accordance with the invention is constructed and arranged to provide a peelable closure when the bag 10 has its temperature elevated as a result of the microwave cooking operation for which it is made. What occurs is that the cold seal closure 20 becomes softened when exposed to the heat produced to thereby form a peelable closure that can be opened easily, without tearing the paper material providing the side panels 11–14, by the manual application of a separating force (as illustrated in FIG. 12) which pulls side panels 11–14 apart. It will be noted that the heat seal closure 106 is constructed and arranged so that it requires a higher separating force to open the same than the force required to open the cold seal closure 20 during and on completion of the microwave cooking operation. Moreover, as discussed above, the cold seal closure 20 can readily provide controlled venting and obviate the problems of non-venting that can occur in packages with heat seal closures at both ends.

A method of making a bag in accordance with the invention is shown in FIGS. 13 to 17. An initial step in the method is to provide a web 30 of flexible material for use in forming a tube, said web of material having a plurality of successive web lengths 32 of equal size such as that shown in FIG. 14 wherein part of a flat web 30 is illustrated. Each web length 32 has a first deposit 20A of a cold seal adhesive suitable for forming the cold seal closure 20 at its one end and a second deposit 22 of a heat seal adhesive suitable for forming the heat seal closure 106 of package 100 (as described above) at its other end. Deposits 20A and 22 extend transversely across each web length 32 at the ends thereof as shown in FIG. 14. Each web length 32 extends between the two transversely extending cut-off lines indicated at 34 in FIG. 14 and located adjacent to and outwardly of adhesive deposits 20A and 22. In order to make a bag 10 of the 6.0×11.625 inch size described above, each web length 32 is 21.0 inches wide and 11.625 inches long.

After web 30 has adhesive deposits 20A and 22 applied thereto (which is typically done by a printing operation), it is wound into a large coil and delivered to the bag making machine. In the case of bag 10, the adhesive deposits are applied to a web used to provide the single ply of material from which bag 10 is made. In the case of bag 10', the adhesive deposits are applied to a web used to provide the inner ply of the two-ply material from which bag 10' is made.

In FIG. 13, there is shown a production line for making a pinch bottom bag such as the bag 10' shown in FIGS. 5 to 8. In FIG. 13, arrows are used to show the direction of movement of the webs through the bag making machine shown therein. At its input end at the right end of FIG. 13, there is provided a flexographic printing press 40 which has the outer ply of the two-ply bag material fed therethrough from a coil 41 thereof (as shown by the arrows in FIG. 13) so that the desired ink printing is applied on the side of the outer ply which will be formed into the outer surface of the bag 10'. This printing press arrangement is conventional in the art.

The outer ply is fed from the press 40 across idler rollers 42 and 44 to a work station 46 whereat the susceptor patch is applied to the inner surface outer ply from a coil 48' thereof by a construction that is conventional in the art. The outer ply with the susceptor patch applied thereto is then passed through a work station 48 whereat the liner, or inner ply of the two-ply bag material, is laminated onto the inner side of the outer ply by an arrangement conventional in the art. Also at work station 48, the seam adhesive for forming the longitudinal seam 19 is applied by a glue applicating roller indicated at 49. The liner is supplied from a pre-printed coil 50' which has the cold seal adhesive deposit 20A and heat seal adhesive deposit 22 pre-applied thereto in the arrangement of web lengths 32 as shown in FIG. 14.

The two-ply web with the seam adhesive thereon and the susceptor patches located between the plies is then fed from the work station 48 to a tube forming machine 50. The tube forming machine 50 is conventional and is constructed and arranged for the forming of a tube from a flat web by means of a conventional former plate arrangement. Because of the tackiness of the cold seal adhesive deposit 20A, a "Teflon" former is used, which reduces friction between the adhesive and the former plate. The conventional forming machine 50 operates by forming a tube around former plates and then passing a formed tube-shaped web between a pair of cooperating draw rollers 52 and 54 (FIG. 15) to a pair of cut-off rollers 56 and 58 which cut this web along the transverse cut-off lines 34 to form tube lengths 59 as shown in FIG. 16.

From the cut-off rollers 56 and 58, a formed and cut-off tube length 59 is fed by a pair of transfer rolls 60 and 62 to a work station 64 shown in FIG. 17 whereat the cold seal closure 20 is formed. As shown in FIG. 15, the tube length 59 passes from the cut-off rollers 56 and 58 and is fed by a pair of transfer rollers 60 and 62 between a pair of rollers 66 and 68 which form the cold seal closure 20 at the end of the tube length 59 by an arrangement shown in detail in FIG. 17. To this end, the lower roller 68 is made of a high durometer rubber and the upper roller comprises a crimp block 67, which is a metal strip extending across the entire width of the tube length and mounted in a recess on the periphery of roller 66. Crimp block 67 has the desired crimp pattern, namely, a plurality of rib-like projections, formed in its outer surface facing lower roller 68. The position of the rollers 66 and 68 are controlled by an air regulated system to ensure that a consistent pressure (such as produced by a pressure setting of 50–90 PSI) is applied to the end of the tube length 59 passing therebetween so to pressurize the same in order to form the cold seal closure 20 in accordance with the invention.

The completed bag 10', which comprises a tube with the cold seal closure 20 formed at its one end, is then fed around a drum 80 and stored in a collector area 82 for pick-up.

The production line shown in FIG. 13 is essentially conventional except for the portion thereof whereat the formed tube 59 is fed to the cold sealing station 64. As is apparent from the consideration of the drawings, the production line is very compact and is arranged in a straight line whereby it can be constructed to operate at very high speeds. In prior comparable pinch bottom production lines, the length of the line required to produce the conventional heat seal closure at one end of the pinch bottom bag is much longer than that of the cold seal station 64 shown in FIG. 13 and requires a considerable dwell time to perform the heat seal closure step.

A method of making a bag 10 as shown in FIGS. 1 to 4 is essentially the same as that shown in FIGS. 13 to 17, the only difference being that a single ply of material is used and there is no need to combine two plies as described in the method described above. In this case, a coil of the single ply material is mounted in the press 40 at the same location as the coil 41 for the outer ply and a liner coil 50' is not necessary.

Figure 18:
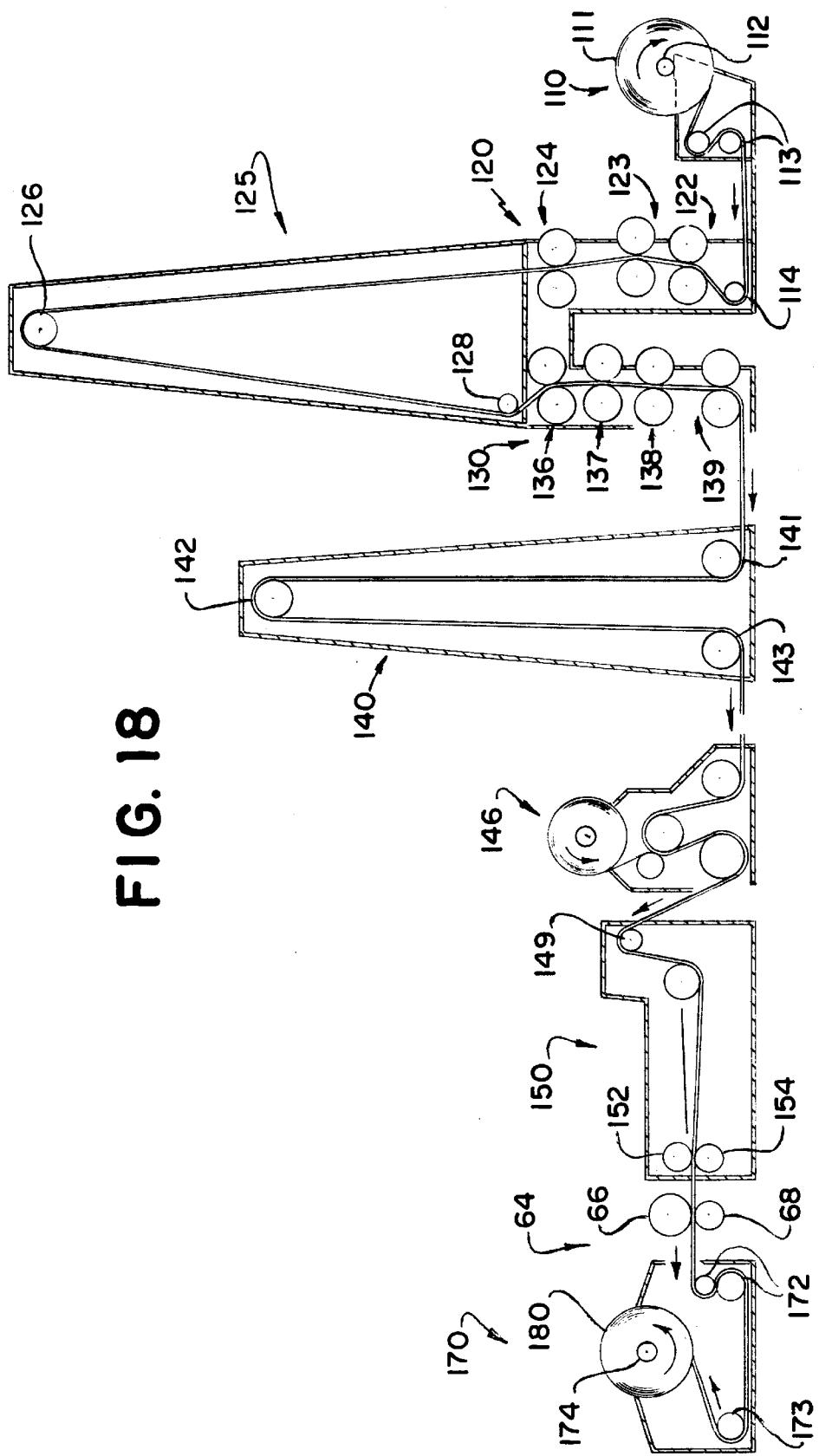
FIG. 18 is a side elevation, partly in diagrammatic form, showing a manufacturing process line for making a tubular roll from which bags in accordance with the invention can be made.

In FIG. 18, there is shown a production line for making a continuous tubular web comprised of a plurality of tube lengths which can be made into a pinch bottom bag 10, said web being wound into a roll from which a plurality of said bags 10 can be cut in a subsequent package forming operation wherein a package such as that shown hereinbefore can be made.

The production line shown in FIG. 18 comprises an unwind station 110 which includes a roll 111 of a single ply material of the type described above for making the bag 10, said roll 111 being mounted on a spool 112 with the web being fed from the roll 111 around a pair of dancer rollers 113 which feed the web around a roller 114 at the entry end of a printing station 120 comprising three pairs of rollers 122, 123, and 124. The pairs of rollers 122 and 123 are constructed and arranged to print onto the web passing therethrough the strips of the adhesive deposits 20A and 22, respectively, which are arranged as shown in FIG. 14. Thus, as the web is fed upwardly from the rollers 124 to leave the printing station 120, the web is in the condition such as that shown in FIG. 14 wherein part of a flat web 30 is illustrated. Thus, each web length 32 has a first deposit 20A of a cold seal adhesive suitable for forming the cold seal closure 20 at its one end and a second deposit 22 of a heat seal adhesive suitable for forming the heat seal closure, such as the heat seal closure 106 of package 100 (as described above), at its other end. Deposits 20A and 22 extend transversely across each web length 32 at the ends thereof with each web length 32 extending between two transversely extending spaced apart cut-off lines indicated at 34 and located adjacent to and outwardly of adhesive deposits 20A and 22 as is shown in FIG. 14.

From printing station 120, the web moves upwardly into a drying tunnel 125, and passes around a roller 126 and back downwardly to an exit roller 128 at the lower end of the drying tunnel 125. As the web travels through the drying tunnel 125, heat is applied thereto to dry the adhesive deposits 20A and 22 applied at the printing station 120.

The web is fed from the roller 128 of drying tunnel 125 downwardly into a second printing station 130 which applies the graphics to the web surface which is to become the outer surface of the formed bag. The printing station 130 shown in FIG. 18 comprises four pairs of printing rollers 136, 137, 138, and 139, three of which are used for the application of colors to produce the desired graphics and one of which is used for the application of a heat seal adhesive for tacking the gusseted panels together at the heat seal end of the bag.

From the second printing station 130, the web is fed to a second drying tunnel 140 and passes sequentially around lower roller 141, upper roller 142, and lower roller 143. As the web is passed through the second drying tunnel 140, heat is applied thereto to dry the ink providing the colors printed thereon and the heat seal adhesive for the gussets.

From the second drying tunnel 140, the web is fed to a patching station 146 which is essentially the same as patching station 46 described above with respect to the production line shown in FIG. 13. At the patching station 146, a susceptor patch is applied to the inner surface of the web and the web with the susceptor patch applied thereto is fed to a roller 149 at the inlet of a tube forming machine 150 which is essentially the same as the forming machine 50 described above with respect to the production line shown in FIG. 13. At the entry roller 149, the seam adhesive for forming the longitudinal seam 19 is applied by a glue applicating roller. From this roller 149, the web is fed into the tube forming machine 150 which forms a continuous tube from a flat web by means of a conventional former plate arrangement. Forming machine 150 forms a tube around former plates and then passes the tube-shaped web between a pair of rollers 152 and 154 to the next work station indicated at 64'.

As shown in FIGS. 19 and 20, the tube formed by the forming machine 150 comprises a pair of opposed flat sides, such as sides 11 and 13 of the bag 10, and a pair of opposed intucked sides, such as the sides 12 and 14 of the bag 10.

From this point whereat the tubular web is fed from the former 150, the production line shown in FIG. 18 differs from that shown in FIG. 13 in that the tubular web is not cut into a plurality of separated tube lengths, but, instead, is fed directly to the work station 64' comprising the pair of rollers 66 and 68 as shown in FIG. 17 and described in detail above. Thus, rollers 66 and 68 are operable to form the cold seal closure 20 at the end of the successive continuous tube lengths indicated at 59' in FIG. 19. The station shown at 64' is shown in detail in FIG. 19 and comprises a lower roller 68 made of a high durometer rubber and an upper roller 66 comprising a crimp block 67, rollers 68 and 66 being described in detail above with respect to FIG. 17. The work station 64' is essentially the same as work station 64 shown in FIG. 17, the only difference being that the web passing between the rollers 66 and 68 is a continuous tubular web comprising successive tube lengths 59' and has not been cut into a plurality of separated tube lengths 59 as is the case in the method shown in FIG. 13.

After the cold seal closure 20 is formed at station 64', the continuous tubular web is passed around a pair of entry rollers 172 of a rewind station 170. From the two entry rollers 172, the tubular web is fed around an idler roller 173 and wound onto a spool 174 into a roll 180. It will be apparent that the roll 180 comprises a continuous tubular web wound into a rolled configuration and comprising a plurality of successive tube lengths 59' from which a plurality of bags 10 can be made by simply cutting off the web along the cut-off lines 34 between the locations whereat the heat seal and cold seal adhesives 22 and 20A, respectively, are applied.

The roll 180 formed by the production line shown in FIG. 18 can be removed from the rewind station 170 and shipped to the packager whereat it can be placed in a package filling production line whereat the tube lengths 59' are cut into bags 10 as they are fed from the roll 180, whereupon the bags 10 can be filled and closed at the heat seal end to provide a package such as that shown and described above.

Figure 21:
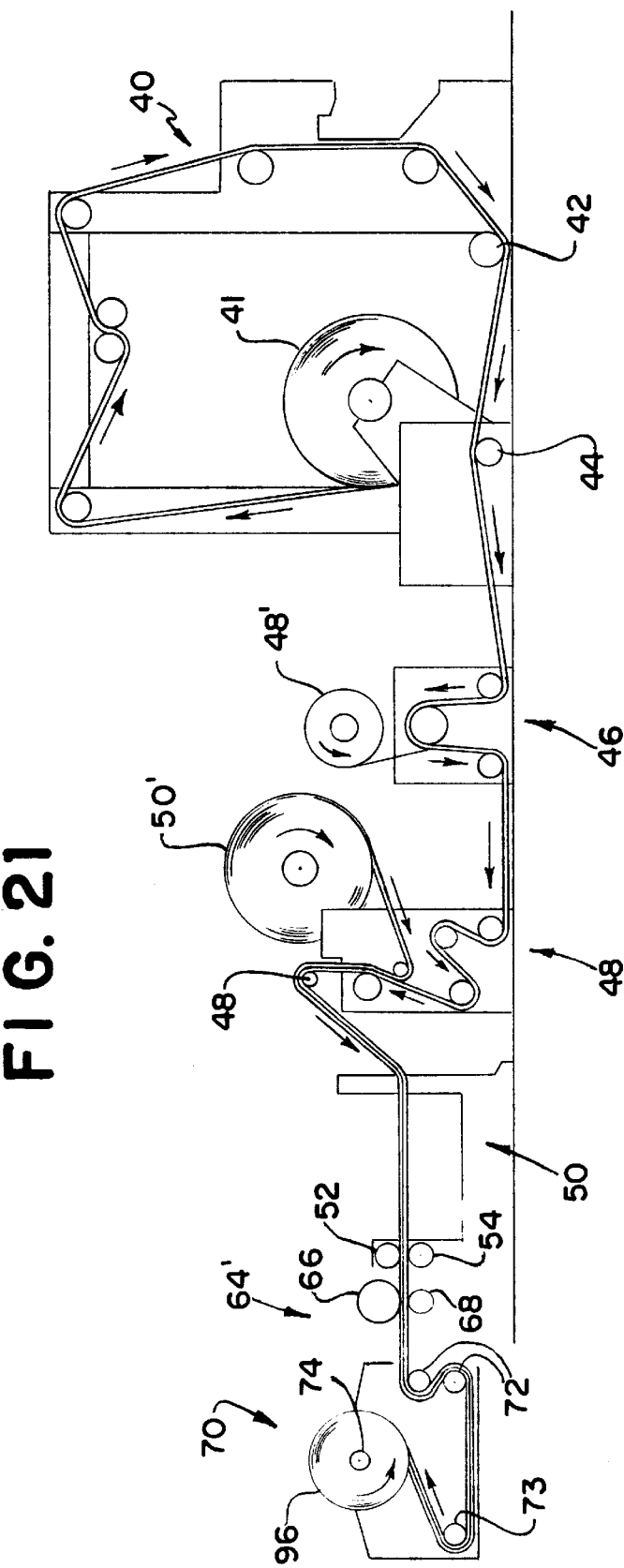
FIG. 21 is a side elevation, partly in diagrammatic form, showing another manufacturing process line for making a tubular roll from which bags in accordance with the invention can be made.

In FIG. 21, there is shown a production line for making a continuous tubular web comprised of a plurality of tube lengths which can be made into a pinch bottom bag 10', said web being wound into a roll 96 from which a plurality of said bags 10 can be cut in a subsequent package forming operation wherein a package such as that shown hereinbefore can be made.

The production line shown in FIG. 21 is similar to that shown in FIG. 13 and comprises the same conventional flexographic printing press 40, the same work stations 46 and 48, and the same conventional tube forming machine 50. Thus, press 40 has the outer ply of the two-ply bag material for making bag 10' fed therethrough from a coil 41 thereof with the desired ink printing applied to the side of the outer ply which will be formed into the outer surface of the bag 10'. The outer ply is fed from the press 40 across idler rollers 42 and 44 to work station 46 whereat the susceptor patch is applied to the inner surface of outer ply from a coil 48' thereof. Also, at work station 48, the seam adhesive for forming the longitudinal seam 19' is applied by a glue applicating roller indicated at 49 and the liner for the bag 10' is applied from a pre-printed coil 50', which liner has the cold seal adhesive deposit 20A and the heat seal deposit 22 pre-applied thereto in the arrangement of the web lengths 32 as shown in FIG. 14. The two-ply web with the seam adhesive thereon and the susceptor patches located between the plies at spaced apart intervals is then fed from the work station 48 to the tube forming machine 50 which forms a continuous tube from a flat web by means of a conventional former plate arrangement. Forming machine 50 forms a tube around former plates and then passes the formed tube-shaped web between a pair of cooperating draw rollers 52 and 54 to the next work station indicated at 64'.

From this point whereat the tubular web is fed from the former 50, the production line shown in FIG. 21 differs from that shown in FIG. 13. In the production line shown in FIG. 21, the tubular web is not cut into a plurality of separated tube lengths but, instead, is fed directly to the work station 64' comprising of the pair of rollers 66 and 68 shown in FIG. 17 and described in detail above, said rollers 66 and 68 being operable to form the cold seal closure 20 at the end of each of successive tube lengths such as indicated at 59' in FIG. 19.

The station shown at 64' is shown in detail in FIG. 19 and comprises a lower roller 68 made of a high durometer rubber and an upper roller comprising a crimp block 67 identical to that described above with respect to FIG. 17. The work station 64' is essentially the same as that shown in FIG. 17, the only differences being that the tubular web passing between the rollers 66 and 68 is a continuous tubular web comprising successive tube lengths 59' and has not been cut into a plurality of separated tube lengths 59 as is the case in the method shown in FIG. 13. As discussed above with respect to the arrangement shown in FIG. 17, the position of the rollers 66 and 68 are controlled by an air regulated system to ensure that a consistent pressure is applied to the end of the tube length 59' passing therebetween so as to pressurize the same in order to form the cold seal closure 20 in accordance with the invention.

After the cold seal closure 20 is formed at station 64', the continuous tubular web is fed to a rewind station 70 whereat the tubular web is fed to a pair of entry rollers 72 and a roller 73 and wound onto a spool 74 into a roll 96. It will be apparent that the roll 96 comprises a continuous tubular web wound into a roll configuration, said roll 96 comprising a plurality of tube lengths 59' from which a plurality of bags 10' can be made by simply cutting off the tubular web along the cut-off lines 34 between the locations whereat the heat seal and cold seal adhesive 20A and 22, respectively, are applied.

The roll 96 can be shipped to the packager whereat it can be placed in a package filling production line whereat the tube lengths 59' are cut into bags 10' as they are fed from the roll 96 whereupon the bags 10' can be filled and closed at the heat seal end to provide a package such as that shown and described above.

It will be apparent that the production line shown in FIG. 21 can be modified easily to provide a production line for making a roll comprising a continuous tubular web lengths which can be made into a pinch bottom bag 10, the only difference being that a single ply of material is used and there is no need to combine two plies as described in the method shown in FIG. 21. Also, in this case, a coil of the single ply material is mounted in the press 40 at the same location as the coil 41 for the outer ply and a liner coil 50' is not necessary.

The main advantage of forming a roll such as the rolls 96 and 180 comprising a continuous web having a plurality of the tube lengths as discussed above is that it eliminates individual bag handling at both the bag making plant and at the plant where the bag is filled to form a package.

While the invention has been disclosed by reference to the details of preferred embodiments, this disclosure is intended in an illustrative rather than in a limiting sense, as it is contemplated that modifications will readily occur to those skilled in the art, within the spirit of the invention and the scope of the appended claims.

What is claimed is:

1. A roll comprising a continuous tubular web having a plurality of tube lengths which can be made into bags suitable for use in microwave cooking, said tubular web comprising a flexible material, the flexible material including paper material, said tubular web comprising a plurality of successive tube lengths connected serially in end-to-end relationship, each tube length comprising a plurality of side panels and having an open end and a closed end, a deposit of a cold seal adhesive across the inside of the closed end of each tube length for sealing the side panels together at the closed end of each tube length, said cold seal adhesive being an adhesive which exhibits an affinity for itself whereby when two separate surfaces having said cold seal adhesive thereon are brought together under pressure they exhibit a strong tendency to stick to each other which provides a tearing or destruct bond on the flexible material without the aid of heat or dwell time, as is required in a typical heat seal, when brought together under pressure only, said side panels of each tube length having pressure applied thereto at locations whereat said cold seal deposit is located to form a cold seal closure extending thereacross whereby each tube length is closed at one end by said cold seal closure, said cold seal closure formed from the cold seal adhesive being such that at ambient temperatures said cold seal closure cannot be opened without tearing the flexible material of the web and such that at elevated temperatures produced in microwave cooking said cold seal closure forms a peelable closure that may be opened without tearing the flexible material of the web, a deposit of heat seal adhesive at the open end of each tube length for use in closing this end of the tube length after it is filled with a product, said heat seal adhesive deposit being in the form of a band extending around the inner surface of the side panels at the open end of each tube length, and the deposit of heat seal adhesive being adapted to form a heat seal closure that forms a bond that is stronger than the bond formed by the cold seal adhesive at the elevated temperatures produced by microwave cooking operation.

2. A roll according to claim 1 including a susceptor patch attached to one of said side panels.

3. A roll according to claim 1 wherein said cold seal adhesive comprises a natural latex cohesive.

4. A roll of microwave cooking bags comprising a continuous tubular web having a plurality of successive microwave cooking bags connected together serially in end-to-end relationship and separated by cut-off lines, said bags being of pinch bottom bag construction including a pair of opposed rectangular side panels joined by a pair of opposed inwardly-folded gusseted side panels, said rectangular side panels having a middle portion and two side portions, said bags having an open end and a closed end, said bags being made of grease-resistant paper material, a cold adhesive sealing band across the inside of the closed end of the bag which seals the gusseted side panels to the side portions of said opposed rectangular side panels so that the sealed gusseted side panels form flaps, and which seals the middle portion of said opposed rectangular side panels together, said bags having a longitudinal seam, said longitudinal seam being sealed by an aqueous adhesive, said cold adhesive being an adhesive which exhibits an affinity for itself whereby when two separate surfaces having said cold adhesive thereon are brought together under pressure they exhibit a strong tendency to stick to each other which provides a fiber tearing or destruct bond on the paper material without the aid of heat or dwell time, as is required in a typical heat seal, when brought together under pressure only, said cold seal band providing a bond which at ambient temperature cannot be opened without tearing the paper material, but which at elevated temperature, such as that produced by a microwave cooking operation, is softened to form a peelable closure bond that is opened easily without tearing the paper material by manually applying a separating force which pulls the panels apart, a deposit of heat seal adhesive at the open end of the bags for use in closing this end of the bag after the bag is filled with a food product, said heat seal adhesive deposit being in the form of a band extending around the inner surface of the panels, and the deposit of heat seal adhesive being adapted to form a heat seal closure that forms a bond that is stronger than the weaker bond formed by the cold seal bond at the elevated temperatures produced by a microwave cooking operation.

5. The roll of microwave cooking bags of claim 4, including a susceptor mounted on one of the panels.

6. The roll of microwave cooking bags of claim 4, including a tacking deposit of heat seal adhesive on the gusseted panels at the heat seal end of the bag for tacking the gusseted panels together.

7. The roll of microwave cooking bags of claim 4, including ink printing on the outer surface of the bags.

8. The roll of microwave cooking bags of claim 4, wherein the bags have a liner inside said side panels.

9. The roll of microwave cooking bags of claim 4, said weaker cold seal bond being adapted to provide controlled venting at a desired stage of microwave cooking.

10. A roll of microwave popcorn bags comprising a continuous tubular web having a plurality of successive popcorn bags connected together serially in end-to-end relationship and separated by cut-off lines, said bags being of pinch bottom bag construction including a pair of opposed rectangular side panels joined by a pair of opposed inwardly-folded gusseted side panels, said rectangular side panels having a middle portion and two side portions, said bags having an open end and a closed end, said bags being made of grease-resistant paper material, a cold adhesive sealing band across the inside of the closed end of the bag which seals the gusseted side panels to the side portions of said opposed rectangular side panels so that the sealed gusseted side panels form flaps, and which seals the middle portion of said opposed rectangular side panels together, said bags having a longitudinal seam, said longitudinal seam being sealed by an aqueous adhesive, said cold adhesive being an adhesive which exhibits an affinity for itself whereby when two separate surfaces having said cold adhesive thereon are brought together under pressure they exhibit a strong tendency to stick to each other which provides a fiber tearing or destruct bond on the paper material without the aid of heat or dwell time, as is required in a typical heat seal, when brought together under pressure only, said cold seal band providing a bond which at ambient temperature cannot be opened without tearing the paper material, but which at elevated temperature, such as that produced by a microwave cooking operation, is softened to form a peelable closure bond that is opened easily without tearing the paper material by manually applying a separating force which pulls the panels apart, a deposit of heat seal adhesive at the open end of the bags for use in closing this end of the bag after the bag is filled with popcorn kernels, said heat seal adhesive deposit being in the form of a band extending around the inner surface of the panels, the deposit of heat seal adhesive being adapted to form a heat seal closure that forms a bond that is stronger than the weaker bond formed by the cold seal bond at the elevated temperatures produced by a microwave cooking operation, said weaker cold seal bond being adapted to provide controlled venting at a desired stage of microwave cooking, a susceptor mounted on one of the panels, a tacking deposit of heat seal adhesive on the gusseted panels at the heat seal end of the bag for tacking the gusseted panels together, ink printing on the outer surface of the bags, and a liner inside said side panels of the bags.

\* \* \* \* \*